US011368336B2

(12) United States Patent
Porter et al.

(10) Patent No.: US 11,368,336 B2
(45) Date of Patent: Jun. 21, 2022

(54) METHOD AND APPARATUS FOR INTERFACING WITH A CIRCUIT SWITCHED NETWORK

(71) Applicant: The Regents of the University of California, Oakland, CA (US)

(72) Inventors: George Porter, San Diego, CA (US); William Mellette, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 175 days.

(21) Appl. No.: 16/629,781

(22) PCT Filed: Jul. 10, 2018

(86) PCT No.: PCT/US2018/041504
§ 371 (c)(1),
(2) Date: Jan. 9, 2020

(87) PCT Pub. No.: WO2019/014263
PCT Pub. Date: Jan. 17, 2019

(65) Prior Publication Data
US 2020/0235960 A1 Jul. 23, 2020

Related U.S. Application Data

(60) Provisional application No. 62/530,780, filed on Jul. 10, 2017.

(51) Int. Cl.
*H04L 12/66* (2006.01)
*H04L 45/02* (2022.01)
(Continued)

(52) U.S. Cl.
CPC ............ *H04L 12/66* (2013.01); *H04L 45/026* (2013.01); *H04L 49/3036* (2013.01); *H04L 49/552* (2013.01); *H04L 69/22* (2013.01)

(58) Field of Classification Search
CPC ... H04L 12/66; H04L 45/026; H04L 49/3036; H04L 49/552; H04L 69/22; H04L 49/55;
(Continued)

(56) References Cited

U.S. PATENT DOCUMENTS 6,208,638 B1 * 3/2001 Rieley ................ H04N 1/00209
370/354
6,222,820 B1 * 4/2001 Hamami ............ H04Q 11/0478
370/218
(Continued)

FOREIGN PATENT DOCUMENTS

WO WO-2010/114439 A1 10/2010
WO WO-2015/031235 A1 3/2015

OTHER PUBLICATIONS

Alistarh, D. et al., "High-Radix, Low-Latency Optical Switch for Data Centers" (SIGCOMM '15).
(Continued)

*Primary Examiner* — Hassan Kizou
*Assistant Examiner* — Abdullahi Ahmed
(74) *Attorney, Agent, or Firm* — Mintz Levin Cohn Ferris Glovsky and Popeo, P.C.

(57) ABSTRACT

An apparatus for interfacing with a circuit switched network may be configured to detect when a data carrier signal from a circuit switched network is offline. While the data carrier signal from the circuit switched network is offline, the apparatus may send, to a network element coupled with the circuit switched network via the apparatus, control packets indicating that the data carrier signal is offline. The apparatus may further maintain an active data carrier signal between the apparatus and the network device by sending, to the network element, protocol idle frames. The apparatus may buffer, at the apparatus, packets sent from the network element to the circuit switched network. Once the data carrier signal is restored, the apparatus may send, to the
(Continued)

circuit switched network, control packets indicating that the data carrier signal is online and the packet buffered at the apparatus while the data carrier signal is offline.

18 Claims, 11 Drawing Sheets

(51) Int. Cl.
    *H04L 49/00*     (2022.01)
    *H04L 49/552*     (2022.01)
    *H04L 69/22*     (2022.01)
(58) Field of Classification Search
    CPC ...... H04L 49/15; H04W 92/12; H04W 92/14; H04W 76/25
    See application file for complete search history.

(56) References Cited

U.S. PATENT DOCUMENTS

| | | | | |
|---|---|---|---|---|
| 10,645,031 | B2* | 5/2020 | Wang | H04L 49/70 |
| 2002/0141338 | A1* | 10/2002 | Burke | H04L 12/6418 370/229 |
| 2004/0213195 | A1* | 10/2004 | Islam | H04W 52/0232 370/342 |
| 2005/0058128 | A1* | 3/2005 | Carson | H04L 49/25 370/388 |
| 2007/0014299 | A1* | 1/2007 | Chang | H04L 49/1553 370/397 |
| 2008/0138067 | A1* | 6/2008 | Beshai | H04Q 11/0062 398/45 |
| 2010/0208724 | A1* | 8/2010 | Booth | H04W 24/00 370/352 |
| 2011/0243032 | A1* | 10/2011 | Jenne | H04L 12/12 370/254 |
| 2012/0173905 | A1* | 7/2012 | Diab | H04L 12/66 713/320 |
| 2014/0233588 | A1* | 8/2014 | Chudgar | H04L 69/166 370/474 |
| 2015/0065143 | A1* | 3/2015 | Hsu | H04W 48/16 455/437 |
| 2015/0181317 | A1* | 6/2015 | Yin | H04L 49/356 398/45 |
| 2016/0309394 | A1* | 10/2016 | Pelletier | H04W 76/16 |
| 2017/0064596 | A1* | 3/2017 | Wang | H04W 24/02 |
| 2018/0287869 | A1* | 10/2018 | Munafo | H04L 63/0853 |
| 2020/0014658 | A1* | 1/2020 | Inazu | H04L 49/354 |

OTHER PUBLICATIONS

Beth, T. et al., "A Restricted Crossbar Implementation and Its Applications," SIGARCH Comput. Archit. News 19, Dec. 6, 1991.
Chang, C.-S. et al., "Load Balanced Birkhoff-von Neumann Switches, Part I: One-stage Buffering," Computer Communications 25, 6 (2002), 611-622.
Chen, K. et al., "OSA: An Optical Switching Architecture for Data Center Networks and Unprecedented Flexibility," (NSDI '12).
Chen, K. et al., "WaveCube: A Scalable, Fault-tolerant, High-performance Optical Data Center Architecture," (IEEE INFOCOM '15).
Chen, L. et al., "Enabling Wide-Spread Communications on Optical Fabric with MegaSwitch," (NSDI'17).
Edmonds, J., "Paths, trees, and flowers," Canad. J. Math. 17 (1965).
Facebook, "Introducing data center fabric, the next-generation Facebook data center network," https://goo.glimvder2. (2014).
Farrington, N. et al., "A Multiport Microsecond Optical Circuit Switch for Data Center Networking," IEEE Photonics Technology Letters 25, 16 (2013).
Farrington, N. et al., "Helios: A Hybrid Electrical/Optical Switch Architecture for Modular Data Centers" (SIGCOMM'10).
Gale, D. et al., "College admissions and the stability of marriage," The American Mathematical Monthly 69, 1(1962).
Ghobadi, M. et al., "ProjecToR: Agile Reconfigurable Data Center Interconnect," (SIGCOMM '16).
Greenberg, A. et al., "VL2: A Scalable and Flexible Data Center Network," (SIGCOMM '09).
Hamedazimi, N. et al., "FireFly: A Reconfigurable Wireless Data Center Fabric Using Free-space Optics," (SIGCOMM '14).
Handigol, N. et al., "Reproducible Network Experiments Using Container-Based Emulation," (CoNEXT'12).
Jain, R., "The art of computer systems performance analysis—techniques for experimental design, measurement, simulation, and modeling." (1991).
Liu, H. et al., Circuit Switching Under the Radar with REACToR (NSDI '14).
Liu, H. et al., "Scheduling Techniques for Hybrid Circuit/Packet Networks," (CoNEXT '15).
McKeown, N. "The iSLIP Scheduling Algorithm for Input-Queued Switches," IEEE/ACM Transactions on Networking 7, 2 (1999).
Mellette, W.M. et al., "A scalable, partially configurable optical switch for data center networks," Journal of Lightwave Technology 35, Jan. 2, 2017).
Mellette, W.M. et al., "Scaling Limits of MEMS Beam-Steering Switches for Data Center Networks," Journal of Lightwave Technology 33, Aug. 15, 2015.
Porter, G. et al., "Integrating Microsecond Circuit Switching into the Data Center," (SIGCOMM '13).
Roy, A. et al., "Inside the Social Network's (Datacenter) Network," (SIGCOMM '15).
Shrivastav, V. et al., "Shoal: a lossless network for high-density and disaggregated racks." Cornell Technical Report (2017).
Singh, A. et al., "Jupiter Rising: A Decade of Clos Topologies and Centralized Control in Google's Datacenter Network," (SIGCOMM '15).
Valiant, L.G., "A Scheme for Fast Parallel Communication," SIAM 3. Comput. 11, 2 (1982).
Venkatakrishnan, S.B. et al., "Costly Circuits, Submodular Schedules and Approximate Caratheodory Theorems," (SIGMETRICS '16).
Von Neumann, J., "A certain zero-sum two-person game equivalent to the optimal assignment problem," Contributions to the Theory of Games 2 (1953).
Wang, G. et al., "c-Through: Part-time Optics in Data Centers," (SIGCOMM '10).
Zats, D. et al., "DeTail: Reducing the Flow Completion Time Tail in Datacenter Networks," (SIGCOMM'12).

\* cited by examiner

METHOD AND APPARATUS FOR INTERFACING WITH A CIRCUIT SWITCHED NETWORK

RELATED APPLICATION

This application is a national phase entry of Patent Cooperation Treaty Application No. PCT/US2018/041504 filed Jul. 10, 2018, entitled "METHOD AND APPARATUS FOR INTERFACING WITH A CIRCUIT SWITCHED NETWORK," which claims priority to U.S. Provisional Patent Application No. 62/530,780 filed on Jul. 10, 2017 and entitled "CIRCUIT SWITCHED NETWORK INTERFACE DEVICE," the disclosure of which are incorporated herein by reference in their entirety.

STATEMENT AS TO FEDERALLY SPONSORED RESEARCH

This invention was made with government support under CNS1553490 awarded by the National Science Foundation. The government has certain rights in the invention.

TECHNICAL FIELD

The subject matter disclosed herein relates generally to computing networks and more specifically to interfacing with a circuit switched network.

BACKGROUND

The connections between computing nodes in a packet switched network may be static. As such, computing nodes within a packet switched network may be interconnected by persistent data carrier signals. By contrast, the data carrier signals interconnecting computing nodes within a circuit switched network may fluctuate as the connections between the computing nodes in the circuit switched network undergo periodic reconfiguration. For example, computing nodes within a circuit switched network may be interconnected via one or more switches including, for example, crossbar switches and/or the like. Each switch may include a matrix of individual switching elements. Accordingly, the circuit switched network may be reconfigured by toggling the switching elements to form dedicated connections between at least some of the input ports and output ports of the individual switches.

SUMMARY

Systems, methods, and articles of manufacture, including computer program products, are provided for interfacing with a circuit switched network. In one aspect, there is provided an apparatus. The apparatus may include at least one data processor and at least one memory. The at least one memory may store instructions that, when executed by the at least one data processor cause the apparatus to at least detect that a data carrier signal from a circuit switched network is offline. In response to detecting that the data carrier signal from the circuit switched network is offline, the apparatus may be further caused to at least send, to a network element coupled with the circuit switched network via the apparatus, one or more control packets indicating that the data carrier signal from the circuit switched network is offline; maintain, between the apparatus and the network element, an active data carrier signal by at least sending, to the network element, one or more protocol idle frames.

In some variations, one or more features disclosed herein including the following features can optionally be included in any feasible combination. A first packet sent from the network element to the circuit switched network may be buffered at the apparatus. The apparatus may be further caused to at least detect that the data carrier signal from the circuit switched network is online. In response to the detecting that the data carrier signal from the circuit switched network is online, the apparatus may be further caused to at least: send, to the network element, one or more control packets indicating that the data carrier signal from the circuit switched network is online; send, to the circuit switched network, the first packet buffered at the apparatus while the data carrier signal from the circuit switched network is offline; and forward, to the circuit switched network, a second packet sent from the network element to the circuit switched network.

In some variations, the apparatus may be further caused to at least: receive, from the network element, the first packet; and classify, based at least on a header of the first packet, the first packet as a data packet, the first packet being buffered at the apparatus based at least on the first packet being classified as the data packet.

In some variations, the apparatus may be further caused to at least: receive, from the circuit switched network, a second data packet; classify, based at least on a header of the second data packet, the second data packet as a control packet; and determine, based at least on the second data packet, that the data carrier signal from the circuit switched network is offline.

In some variations, the apparatus may include one or more physical link layer (PHY) chips for coupling the apparatus with the circuit switched network and/or the network element. The apparatus may be integrated into the network element.

In some variations, the apparatus may be configured to serve as an interface between the circuit switched network and a packet switched network containing the network element. The one or more control packets may be sent to the network element to at least prevent the network element from responding to the data carrier signal being offline as a failure of a data link between the network element and the circuit switched network. The data carrier signal from the circuit switched network may be offline while the circuit switched network is undergoing reconfiguration. The data carrier signal from the circuit switched network may be restored once the circuit switched network completes reconfiguration.

Systems, methods, and articles of manufacture, including computer program products, are provided for routing traffic within a circuit switched network. In one aspect, there is provided a system. The system may include at least one data processor and at least one memory. The at least one memory may store instructions that cause operations when executed by the at least one data processor. The operations may include: receiving, at a first computing node, an offer packet indicating a first quantity of traffic that requires routing through the first computing node to reach a second computing node, the offer packet received from a third computing node interconnected to the first computing node by a first interconnection pattern at a selector switch; responding to the offer packet by least sending, to the third computing node, an acceptance packet indicating that the first computing node is able to accept a third quantity of traffic from the third computing node, the third quantity of traffic being determined based at least on a link capacity associated with the first computing node sending a second quantity of traffic to the third computing node; storing, at the first computing node, the third quantity of traffic received from the third computing node in response to the acceptance packet; and in response to the second computing node being interconnected to the first computing node by a second interconnection pattern at the selector switch, sending, to the second computing node, at least a portion of the third quantity of traffic.

In some variations, one or more features disclosed herein including the following features can optionally be included in any feasible combination. The second quantity of traffic may be sent to the third computing node while the third computing node is interconnected to the first computing node by the first interconnection pattern at the selector switch. The second quantity of traffic may include non-local traffic that is being routed through the first computing node to reach the second computing node.

In some variations, the second quantity of traffic may further include local traffic between the first computing node and the second computing node based at least on the link capacity between the first computing node and the second computing node being able to accommodate the local-traffic in addition to the non-local traffic.

In some variations, the selector switch may be configured to switch to the first interconnection pattern during a first timeslot and switch to the second interconnection pattern during a second timeslot. The selector switch may be configured to fully interconnect a plurality of computing nodes by switching between a subset of some but not all possible interconnection patterns between the plurality of computing nodes.

In some variations, another offer indicating a fourth quantity of traffic that requires routing through the first computing node may be received from the second computing node and/or a fourth computing node interconnected to the first computing node by the second interconnection pattern at the selector switch. Another acceptance packet may be generated based at least on a link capacity associated with the first computing node sending at least the portion of the third quantity of traffic to the second computing node.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a network switch, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 2C depicts a block diagram illustrating another example deployment of one or more network interface devices, in accordance with some example embodiments;

When practical, similar reference numbers denote similar structures, features, or elements.

DETAILED DESCRIPTION

Figure 1A:
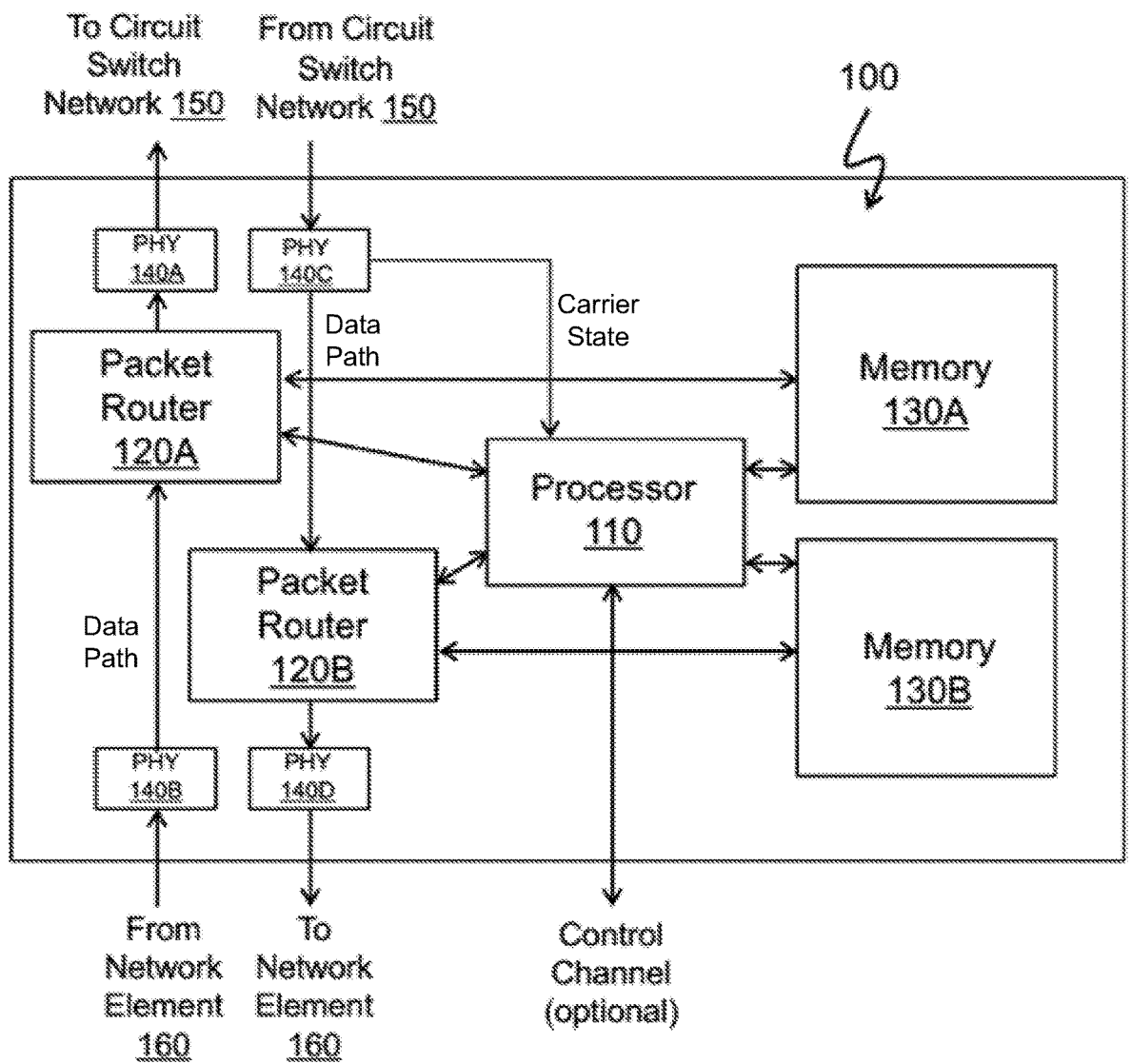
FIG. 1A depicts a block diagram illustrating an example of a network interface device, in accordance with some example embodiments.

The data carrier signal between at least some of the computing nodes within a circuit switched network may be offline while the circuit switched network undergoes reconfiguration. A conventional network element may interpret an offline data carrier signal as a datalink failure and may therefore react to the routine reconfiguration of a circuit switched network by changing the state of the communication software at the network element. These changes may be slow to reverse when the reconfiguration of the circuit switched network is complete and the data carrier signal is restored. The resulting delay during which no traffic is sent over the circuit switched network may effectively limit the frequency at which the circuit switched network may be reconfigured. As such, in some example embodiments, one or more network interface device may be deployed to serve as an interface to a circuit switched network. The one or more network interface devices may isolate fluctuations in a data carrier signal from the network elements coupled with the circuit switched network. In doing so, the one or more network interface devices may mitigate the overhead associated with unnecessary changes to the communication software at the network elements and increase the reconfiguration frequency of the circuit switched network.

In some example embodiments, a network interface device may be coupled with and/or integrated into a network element including, for example, a packet switch, a terminal, and/or the like. The network interface device may be configured to serve as an interface between the network element and a circuit switched network by at least monitoring the status of a data carrier signal on a datalink coupled with the network element. Furthermore, the network interface device may be configured to send, to the network element, an indication of changes in the status of the corresponding data carrier signal, thereby enabling the network element to determine when to inject traffic into the circuit switched network. For example, the network element may inject traffic into the circuit switched network when the circuit switched network is not undergoing reconfiguration and the data carrier signal is online.

In some example embodiments, computing nodes within a circuit switched network may be interconnected using one or more selector switches. A conventional switch may be configured to switch between every possible interconnection pattern between the input ports and the output ports of the switch. By contrast, a selector switch may be configured to switch between a subset of interconnection patterns that includes some, but not all, of the possible interconnection patterns between the input ports and the output ports of the selector switch. Full connectivity between the input ports and the output ports of the selector switch may be realized over time by cycling through the subset of interconnection patterns.

In some example embodiments, some pairs of input ports and output ports in the selector switch may be directly connected via a single interconnection pattern, thereby enabling traffic to flow directly between the computing nodes coupled via those pairs of input ports and output ports. Alternatively and/or additionally, some pairs of input ports and output ports in the selector switch may be indirectly connected by cycling through a sequence of interconnection patterns. Traffic between computing nodes connected via the indirectly connected pairs of input ports and output ports may traverse one or more intermediary computing nodes. As such, according to some example embodiments, the flow of traffic between the computing nodes coupled via the selector switch may be scheduled using an offer-acceptance protocol that operates based on a respective quantity and/or priority of direct traffic and indirect traffic at each of the computing nodes that are interconnected via the selector switch.

In some example embodiments, one or more network interface devices may be deployed to serve as an interface to a circuit switched network by at least being coupled with and/or integrated into any network element including, for example, a packet switch, a terminal, and/or the like. Furthermore, the one or more network interface devices may serve as an interface to any circuit switched network including, for example, a circuit switched network implemented using one or more selector switches. For instance, to provide an interface between a circuit switched network and a packet switched network, one or more network interface devices may be coupled with and/or integrated into a packet switch. Alternatively and/or additionally, one or more network interface devices may be coupled with and/or integrated into a terminal in order to serve as an interface between the terminal and a circuit switched network.

FIG. 1A depicts a block diagram illustrating an example of a network interface device 100, in accordance with some example embodiments. Referring to FIG. 1A, the network interface device 100 may serve as an interface between a circuit switched network 150 and a network element 160. It should be appreciated that the network element 160 may be any network element including, for example, a packet switch, a terminal, and/or the like. Furthermore, in order to serve as an interface between the network element 160 and the circuit switched network 150, the network interface device 110 may be coupled with and/or integrated into the network element 160.

In some example embodiments, the network interface device 100 may include one or more physical layer (PHY) chips including, for example, a first physical layer chip 140A, a second physical layer chip 140B, a third physical layer chip 140C, a fourth physical layer chip 140D, and/or the like. It should be appreciated that the network interface device 100 may be a link layer device. As such, the first physical layer chip 140A, the second physical layer chip 140B, the third physical layer chip 140C, and/or the fourth physical layer chip 140D may serve to connect the network interface device 100 to one or more datalinks including, for example, electrically conductive wires, optical waveguides, fiber optic cables, and/or the like. For example, as shown in FIG. 1A, the first physical layer chip 140A may connect the network interface device 100 to an output datalink to the circuit switched network 150 while the third physical layer chip 140C may connect the network interface device 100 to an input datalink from the circuit switched network 150. Alternatively and/or additionally, the second physical layer chip 140B may connect the network interface device 100 to an input datalink from the network element 160 and the fourth physical layer chip 140D may connect the network interface device 100 to an output datalink to the network element 160. The first physical layer chip 140A, the second physical layer chip 140B, the third physical layer chip 140C, and/or the fourth physical layer chip 140D may each be configured to convert, into a digital data stream, raw communication signals on a corresponding datalink.

Referring again to FIG. 1A, the network interface device 100 may include at least one packet router including, far example, a first packet router 120A, a second packet router 120B, and/or the like. As shown in FIG. 1A, the first packet router 120A may be communicatively coupled with the circuit switched network 150 via the first physical layer chip 140A and with the network element 160 via the second physical layer chip 140B. The first packet router 120A may be configured to classify and/or route packets from originating the network element 160. Alternatively and/or additionally, the second packet router 120B may be communicatively coupled with the circuit switched network 150 via the third physical layer chip 140C and with the network element 160 via the fourth physical layer chip 140D. The second packet router 120B may be configured to classify and/or route packets originating from the circuit switched network 15J.

In some example embodiments, the network interface device 100 may serve as an interface between the circuit switched network 150 and the network element 160 by at least monitoring a status of a data carrier signal on a datalink between the circuit switched network 150 and the network element 160. For example, the network interface device 100 may include at least one microprocessor including, for example, a processor 110 and/or the like. The processor 110 may monitor a status of a data carrier signal between the circuit switched network 150 and the network element 160, for example, by at least monitoring a status of a data carrier signal on the third physical layer chip 140C. As noted, the third physical layer chip 140C may be coupled with an input datalink from the circuit switched network 150. The status of the data carrier signal on the third physical layer chip 140C, which may correspond to the status of the data carrier signal from the circuit switched network 150, may determine a state of the network interface device 100. Furthermore, according to some example embodiments, the network interface device 100 may communicate, to the network element 160, the status of the data carrier signal by at least sending, to the network element 160, one or more control packets. The control packets may be sent to the network element 160 via a data path connection that includes the second packet router 120B and the fourth physical layer chip 140D. Alternatively and/or additionally, the control packets may be sent via a separate control channel between the network interface device 100 and the network element 160.

For example, the processor 110 may determine, based at least on the status of the data carrier signal on the third physical layer chip 140C, that the circuit switched network 150 may be undergoing reconfiguration and the data carrier signal between the circuit switched network 150 and the network element 160 may be offline. As noted, in some example embodiments, the network interface device 100 may isolate the network element 160 from this fluctuation in the data carrier signal from the circuit switched network 150. Accordingly, the processor 110 may maintain an active data carrier signal to the network element 160, for example, by at least sending one or more protocol idle frames to the network element 160. Furthermore, the processor 110 may send, to the network element 160, one or more control packets notifying the network element 160 that the carrier signal from the circuit switched network 150 is offline. As noted, the control packets may be sent to the network element 160 via the data path connection that includes the second packet router 120B and the fourth physical layer chip 140D. Alternatively and/or additionally, the control packets may be sent via the separate control channel between the network interface device 100 and the network element 160.

According to some example embodiments, while the data carrier signal from the circuit switched network 150 is offline, the processor 110 may buffer, at the network interface device 100, any incoming traffic from the network element 160. For example, while the data carrier signal from the circuit switched network 150 is offline, the processor 110 may configure the first packet router 120A to route, to a first memory 130A coupled with the first packet router 120A, one or more packets received from the network element 160 via the second physical layer chip 140B.

As noted, while the data carrier signal from the circuit switched network 150 is offline during the reconfiguration of the circuit switched network 150, the network interface device 100 may send one or more protocol idle frames to the network element 160, for example, by at least configuring the second packet router 120B to send protocol idle frames to the fourth physical layer chip 140D coupled with the output datalink to the network element 160. It should be appreciated that the protocol idle frames may be generated by the second packet router 120B and/or the by processor 110. Alternatively and/or additionally, the second packet router 120B may read the protocol idle frames from a second memory 130B coupled with the second packet router 120B. By sending the protocol idle frames to the network element 160 during the reconfiguration of the circuit switched network 150, the network interface device 100 may maintain an active data carrier signal with the network element 160 regardless of an actual status of the data carrier signal between the network element 160 and the circuit switched network 150. In doing so, the network interface device 100 may isolate the network element 160 from fluctuations in the data carrier signal between the network element 160 and the circuit switched network 150, and prevent costly changes to the state of the communication software at the network element 160 due to the absence of an active data carrier signal from the circuit switched network 150.

In some example embodiments, the processor 110 may determine, based at least on the status of the data carrier signal on the third physical layer chip 140C, that the corresponding data carrier signal between the circuit switched network 150 and the network element 160 may be online. This may occur, for example, when the circuit switched network 150 is not undergoing any reconfiguration. Upon detecting a transition in the status of the data carrier signal transitions from offline to online, the processor 100 may send, to the network element 160, one or more control packets notifying the network element 160 that the data carrier signal from the circuit switched network 150 is online. The control packets may be sent to the network element 160 via the data path connection that includes the second packet router 120B and the fourth physical layer chip 140D. Alternatively and/or additionally, the control packets may be sent via the separate control channel between the network interface device 100 and the network element 160.

Alternatively and/or additionally, while the data carrier signal between the circuit switched network 150 and the network element 160 is online, the processor 110 may configure the first packet router 120A and/or the second packet router 120B to allow traffic to pass directly between the circuit switched network 150 and the network element 160. Alternatively and/or additionally, when the data carrier signal between the circuit switched network 150 and the network element 160 is online, the processor 110 may further configure the first packet router 120A to inject, into the circuit switched network 150, any traffic (e.g., packets and/or the like) that has been buffered in the first memory 130A while the data carrier signal between the circuit switched network 150 and the network element 160 had been offline.

In some example embodiments, the first packet router 120A and/or the second packet router 120B may each be configured to classify the packets exchanged between the circuit switched network 150 and the network element 160. The first packet router 120A and/or the second packet router 120Y may classify, based at least on a header of a packet, the packet as a control packet, a data packet, and/or the like. According to some example embodiments, the first packet router 120A may be configured to classify packets that are being sent from the network element 160 to the circuit switched network 150 while the second packet router 120B may be configured to classify packets that are being sent from the circuit switched network 150 to the network element 160. The first packet router 120A and/or the second packet router 120B may further be configured to route control packets to the processor 110, which may determine, based at least on one or more control packets, a state of the network interface device 100. Alternatively and/or additionally, the processor 110 may configure, based on the control packets, the first packet router 120A and/or the second packet router 120B to route data packets directly between the circuit switched network 150 and the network element 160, and/or to buffer at least some of the data packets in the first memory 130A and/or the second memory 130B.

For example, the second packet router 120B may route, to the processor 110, one or more control packets received from the circuit switched network 150 to at least enable the processor 110 to determine a status of the data carrier signal between the circuit switched network 150 and the network element 160. When the control packets from the circuit switched network 150 indicate the data carrier signal between the circuit switched network 150 and the network element 160 is online, the processor 110 may configure the first packet router 120A to route data packets from the network element 160 directly to the circuit switched network 150. The processor 110 may further configure the first packet router 120A to route data packets buffered in the first memory 130A to the circuit switched network 150, for example, by routing the data packets to the first physical layer chip 140A coupled with the output datalink to the circuit switched network. Alternatively and/or additionally, when the control packets received from the circuit switched network 150 indicate the data carrier signal between the circuit switched network 150 and the network element 160 is offline, the processor 110 may configure the first packet router 120A to buffer the data packets received from the network element 160, for example, by routing the data packets for storage at the first memory 130A.

Figure 1B:
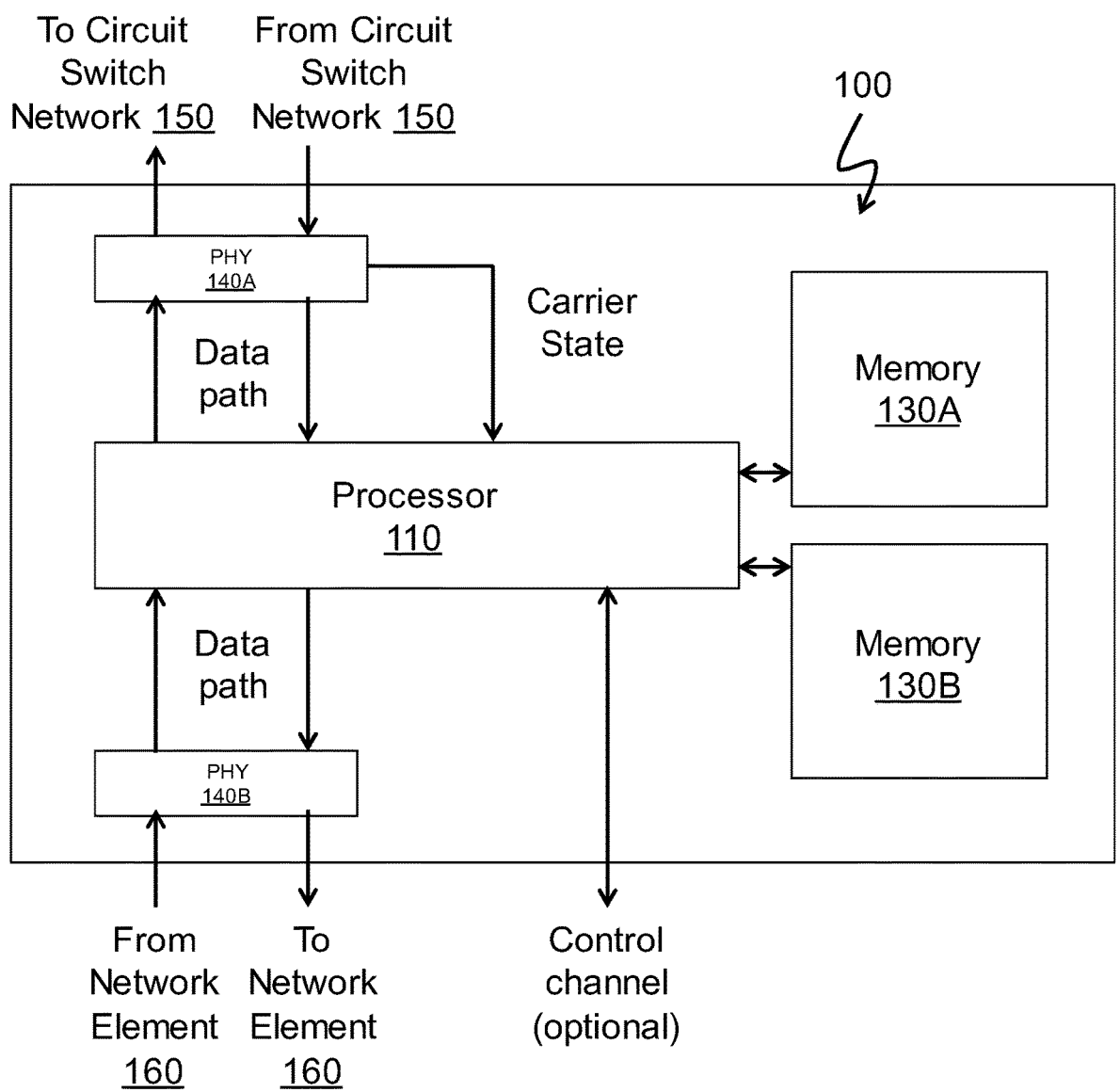
FIG. 1B depicts a block diagram illustrating another example of a network interface device, in accordance with some example embodiments.

FIG. 1B depicts a block diagram illustrating another example of the network interface device 100, in accordance with some example embodiments. As shown in FIG. 1B, the network interface device 100 may not necessarily include the first packet router 120A and/or the second packet router 120B. Instead, the processor 110 may perform the packet routing functionalities of the first packet router 120A and/or the second packet router 120B. Eliminating the first packet router 120A and/or the second packet router 120B may at least simplify the architecture of the network interface device including, for example, the data path between the network interface device 100 and the circuit switched network 150, the data path between the network interface device 100 and the network element 160, and/or the like. Moreover, the network interface device 100 may be implemented using fewer physical layer chips. For example, the example of the network interface device 100 shown in FIG. 1B may be implemented using two physical layer chips (e.g., the first physical layer chip 140A and the second physical layer chip 140B) instead of the four physical layer chips required to implement the example of the network interface device 100 shown in FIG. 1A. Alternatively and/or additionally, should be appreciated that the data link layer functionality may also be implemented, at least partially, with the processor 110, thereby obviating at least some of the need for separate and/or discrete physical layer chips.

Figure 2A:
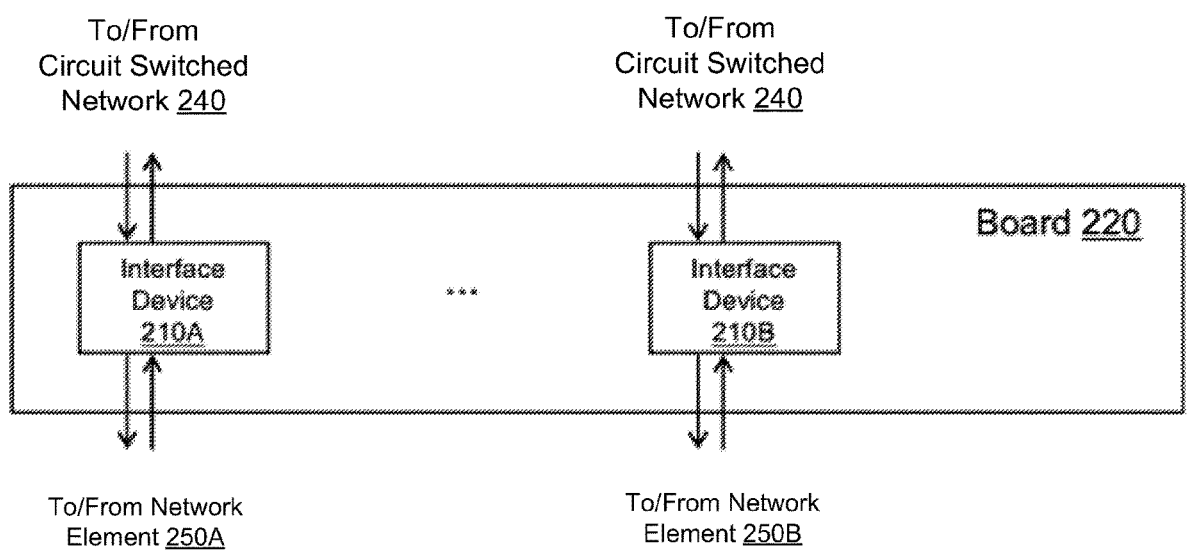
FIG. 2A depicts a block diagram illustrating an example deployment of one or more network interface devices, in accordance with some example embodiments.

In some example embodiments, one or more network interface devices, such as the network interface device 100, may be deployed in any manner to serve as an interface between a circuit switched network and one or more network elements. For example, FIG. 2A depicts a block diagram illustrating an example deployment of one or more network interface devices, in accordance with some example embodiments. Referring to FIG. 2A, multiple network interface devices including, for example, a first network interface device 210A and a second network interface device 210B, may be integrated onto a single board 220.

Referring again to FIG. 2A, the first network interface device 210A may serve as an interface between a first network element 250A and a circuit switched network 240. For example, the first network interface device 210A may send, to the first network element 250A, one or more protocol idle frames in order to isolate the first network element 250A from fluctuations in a data carrier signal between the first network element 250A and the circuit switched network 240, which may occur when the circuit switched network 240 undergoes reconfiguration. The first network interface device 210A may further buffer traffic (e.g., data packets) from the first network element 250A such that traffic from the first network element 250A are not injected into the circuit switched network 240 until the data carrier signal between the first network element 250A and the circuit switched network 240 is online.

Alternatively and/or additionally, the second network interface device 210B may serve as an interface between a second network element 250B and the circuit switched network 240. For example, the second network interface device 210A may also isolate the second network element 250B from fluctuations in a data carrier signal between the second network element 250B and the circuit switched network 240 by at least sending send, to the second network element 250B, one or more protocol idle frames while the circuit switched network 240 is undergoing reconfiguration and the data carrier signal between the second network element 250B and the circuit switched network 240 is offline. Traffic (e.g., data packets) from the second network element 250B may also be buffered at the second interface device 210B while the data carrier signal between the second network interface device 210B and the circuit switched network 240 is offline. Buffered traffic from the second network element 250B may be injected into the circuit switched network 240 once the circuit switched network 240 completes reconfiguration and the data carrier signal between the second network element 250B and the circuit switched network 240 is restored.

Figure 2B:
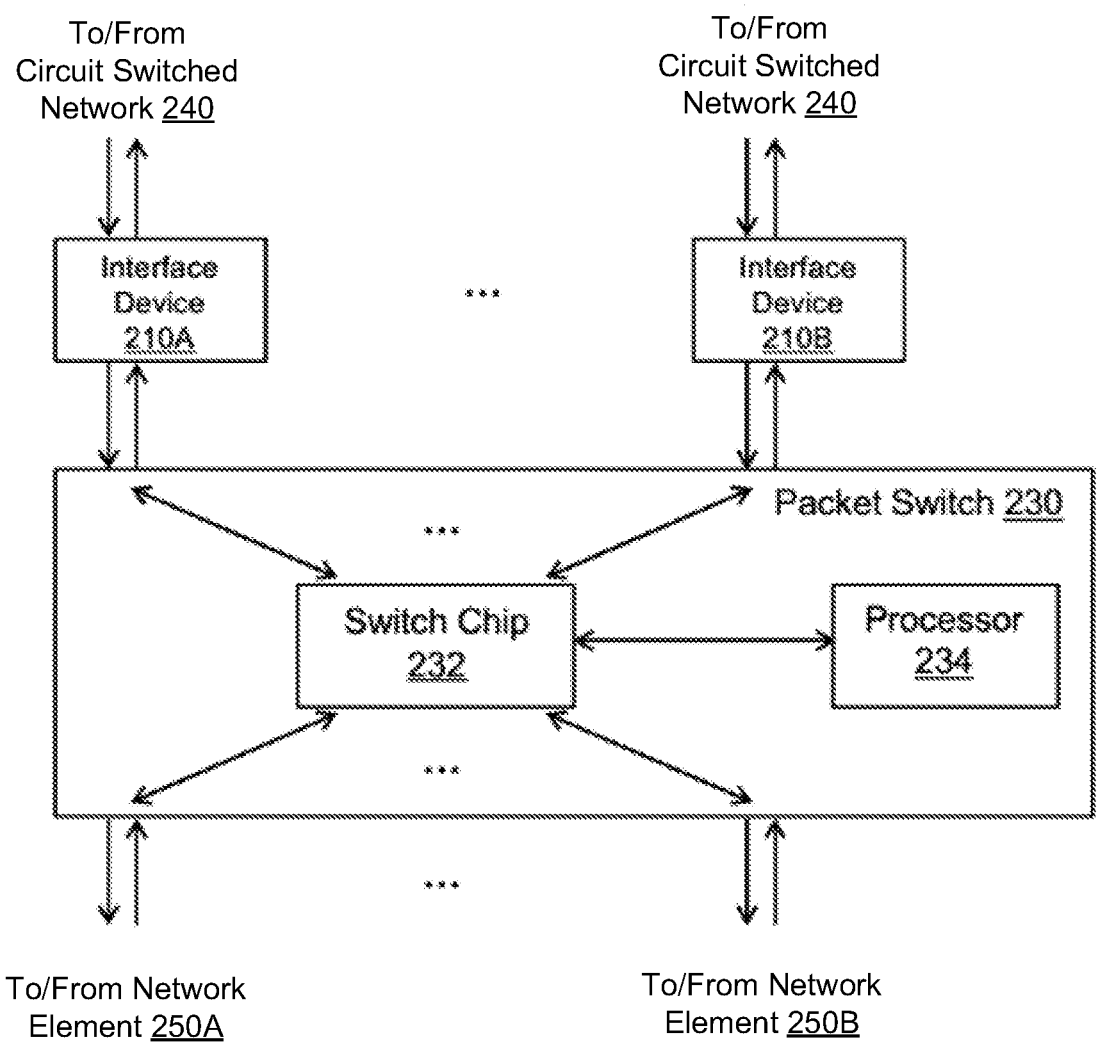
FIG. 2B depicts a block diagram illustrating another example deployment of one or more network interface devices, in accordance with some example embodiments.
Figure 2B:
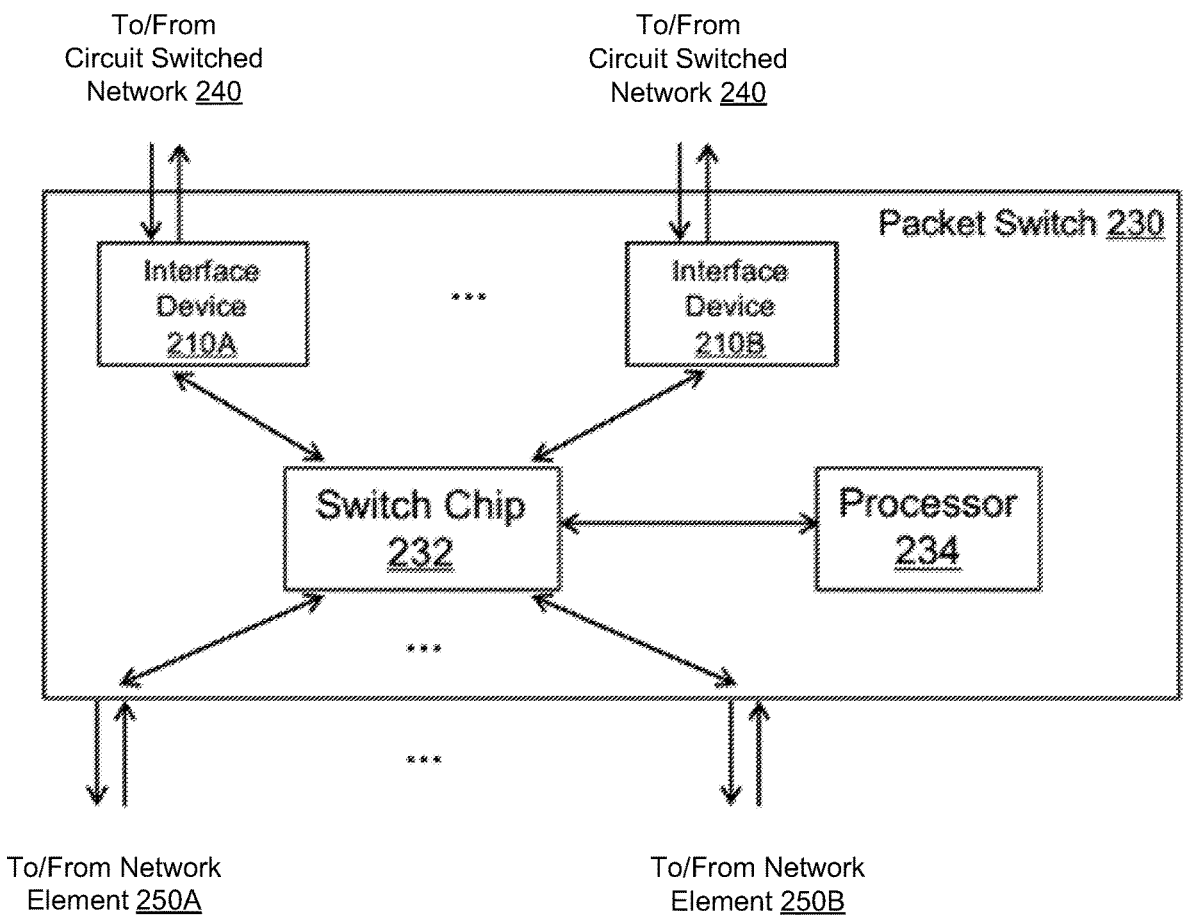

In some example embodiments, the first network interface device 210A and/or the second network interface device 210B may be deployed by at least being coupled with and/or integrated into a network element including, for example, a packet switch, a terminal, and/or the like. To further illustrate, FIG. 2B illustrates an example deployment of the first network interface device 210A and the second network interface device 210B in which the first network interface device 210A and the second network interface device 210B are communicatively coupled with a packet switch 230 configured to route packets in a packet switched network. Alternatively and/or additionally, FIG. 2C illustrates another example deployment of the first network interface device 210A and the second network interface device 210B in which the first network interface device 210A and the second network interface device 210B are integrated into the packet switch 230. As shown in FIGS. 2B-C, the packet switch 230 may include a switch chip 232 and a processor 234. Furthermore, the packet switch 230 may be coupled with one or more network elements including, for example, the first network element 250A and/or the second network element 250B.

Figure 3:
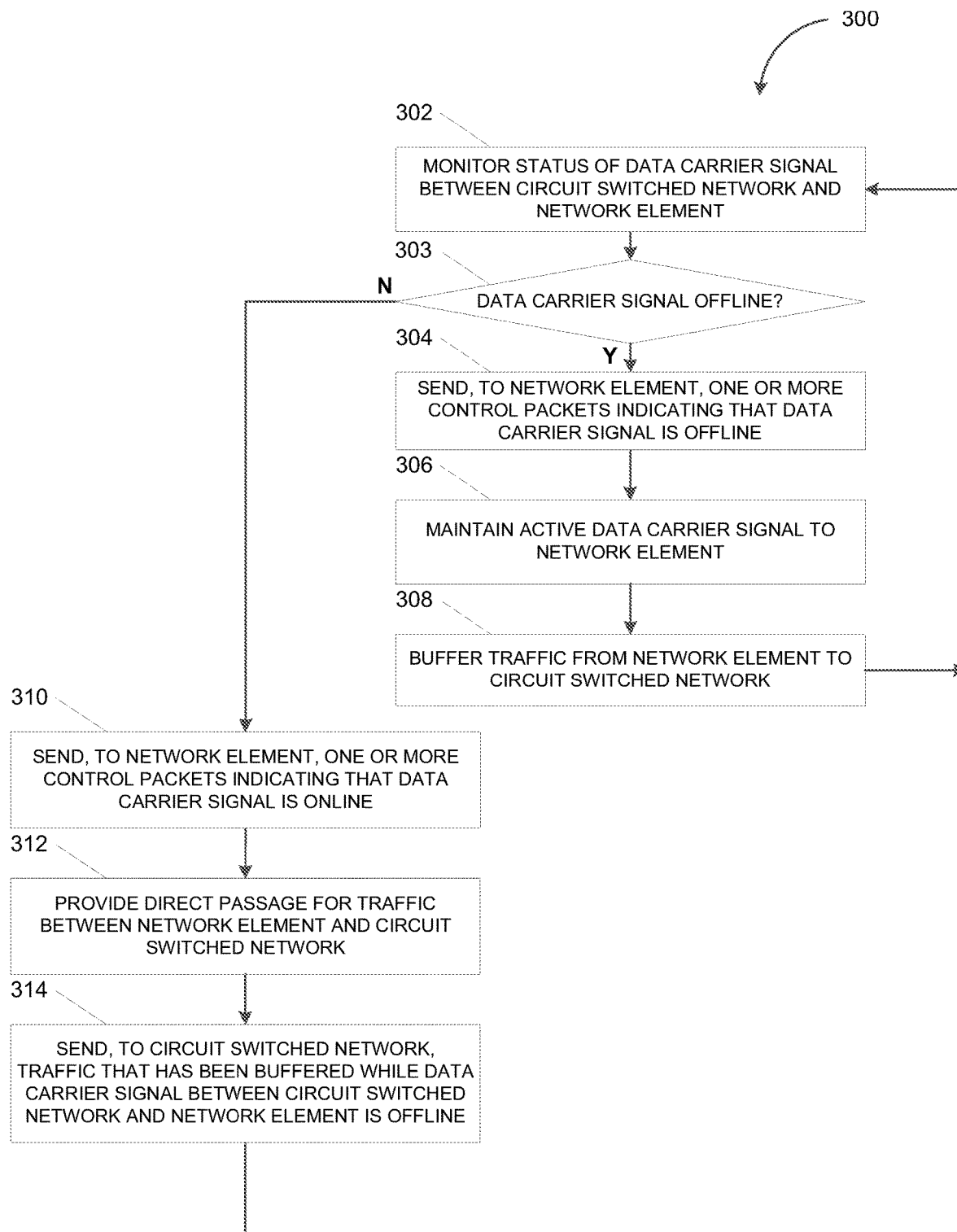
FIG. 3 depicts a flowchart illustrating a process for interfacing with a circuit switched network, in accordance with some example embodiments.

FIG. 3 depicts a flowchart illustrating a process 300 for interfacing with a circuit switched network, in accordance with some example embodiments. Referring to FIGS. 1A-B, 2A-C, and 3, the process 300 may be performed by a network interface device such as, for example, the network interface device 100, the first network interface device 210A, the second network interface device 2103, and/or the like.

At 302, a network interface device may monitor a status of a data carrier signal between a circuit switched network and a network element. Furthermore, at 303, the network interface device may determine whether the data carrier signal between the circuit switched network and the network element is offline. For example, in some example embodiments, the network interface device 100 may determine, based at least on one or more control packets received from the circuit switched network 150, a status of the data carrier signal between the circuit switched network 150 and the network element 160. As noted, the data carrier signal between the circuit switched network 150 and the network element 160 may fluctuate as the circuit switched network 150 undergo periodic reconfiguration. For instance, the data carrier signal between the circuit switched network 150 and the network element 160 may be offline while the circuit switched network 150 is undergoing reconfiguration. Alternatively and/or additionally, the data carrier signal between the circuit switched network 150 and the network element 160 may be restored once the circuit switched network 150 completes reconfiguration.

At 303-Y, the network interface device may determine that the data carrier signal between the circuit switched network and the network element is offline. As such, at 304, the network interface device may send, to the network element, one or more control packets indicating that the data carrier signal between the circuit switched network and the network element is offline. For example, the network interface device 100 may respond to the data carrier signal from the circuit switched network 150 being offline by at least sending, to the network element 160, one or more control packets notifying the network element 160 that the data carrier signal from the circuit switched network 150 is offline. As noted, the network interface device 100 may send the control packets via a data path connection that includes the second packet router 120B and the fourth physical layer chip 140D. Alternatively and/or additionally, the control packets may be sent to the network element 160 via a separate control channel between the network interface device 100 and the network element 160.

Furthermore, at 306, the network interface device may further respond to the data carrier signal between circuit switched network and the network element being offline by maintaining an active carrier signal between the network interface device and the network element. In some example embodiments, the network interface device 100 may isolate the network element 160 from the fluctuation in the data carrier signal between the circuit switched network 150 and the network element 160. For instance, the network interface device 100 may maintain an active data carrier signal to the network element 160 by at least sending one or more protocol idle frames to the network element 160 while the data carrier signal between the circuit switched network 150 and the network element 160 is offline.

At 308, the network interface device may further respond to the data carrier signal between circuit switched network and the network element being offline by buffering, at the network interface device, traffic from the network element to the circuit switched network. For example, the network interface device 100 may buffer any incoming traffic from the network element 160 while the data carrier signal between the circuit switched network 150 and the network element 160 is offline. Furthermore, the process 300 may continue at operation 302 as the network interface device 100 continues to monitor the status of the data carrier signal between the circuit switched network 150 and the network element 160.

Alternatively and/or additionally, at 303-N, the network interface device may determine that the data carrier signal between the circuit switched network and the network element is online. At 310, the network interface device may respond to the data carrier signal between the circuit switched network and the network element being online by at least sending, to the network element, one or more control packets indicating that the data carrier signal is online. For instance, in some example embodiments, the network interface device 100 may detect that the data carrier signal from the circuit switched network 150 has come back online, for example, once the circuit switched network 150 has completed reconfiguration. Upon detecting the transition in the status of the data carrier signal transitions from offline to online, the network interface device 100 may send, to the network element 160, one or more control packets notifying the network element 160 that the data carrier signal from the circuit switched network 150 is online. The control packets may be sent to the network element 160 via the data path connection that includes the second packet router 120B and the fourth physical layer chip 140D. Alternatively and/or additionally, the control packets may be sent via the separate control channel between the network interface device 100 and the network element 160.

At 312, the network interface device may respond to the data carrier signal between circuit switched network and the network element being online by providing a direct passage for traffic between the network element and the circuit switched network. For example, the network interface device 100, based at least on one or more control packets received from the circuit switched network 150, that the data carrier signal between the circuit switched network 150 and the network element 160 may be online. While the data carrier signal between the circuit switched network 150 and the network element 160 is online, the network interface device 100 may allow traffic to pass directly between the circuit switched network 150 and the network element 160.

Furthermore, at 312, the network interface device may respond to the data carrier signal between circuit switched network and the network element being online by sending, to the circuit switched network, traffic that has been buffered at the network interface device while the data carrier signal between the circuit switched network and the network element is offline. For example, when the data carrier signal between the circuit switched network 150 and the network element 160 is online, the network interface device 100 may further inject, into the circuit switched network 150, any traffic (e.g., packets and/or the like) that has been buffered at the network interface device 100 while the data carrier signal between the circuit switched network 150 and the network element 160 had been offline. The process 300 may continue at operation 302 as the network interface device 100 continues to monitor the status of the data carrier signal between the circuit switched network 150 and the network element 160.

In some example embodiments, a circuit switched network such as, for example, the circuit switched network 150 and/or the circuit switched network 240, may be implemented using one or more selector switches. A conventional switch with an N quantity of input ports and an N quantity of output ports may be configured to switch between all of the N! quantity of possible interconnection patterns between the input ports and the output ports of the switch. By contrast, a selector switch having an N quantity of input ports and an N quantity of output ports may be configured to switch between a subset of interconnection patterns that include some but not all of the N! quantity of possible interconnection patterns. At any given instant in time, the selector switch may not be fully interconnected as the selector switch provides only a subset of all of the possible interconnections. However, the selector switch can effectively, over time and using a sequence of interconnection patterns, provide a fully interconnected network topology. As such, a selector switch may be implemented using fewer switching elements than a conventional switch. Alternatively and/or additionally, a selector switch may be implemented using beam steering switching elements that steer in fewer directions than the beam steering switching elements used to implement a conventional switch.

Figure 4A:
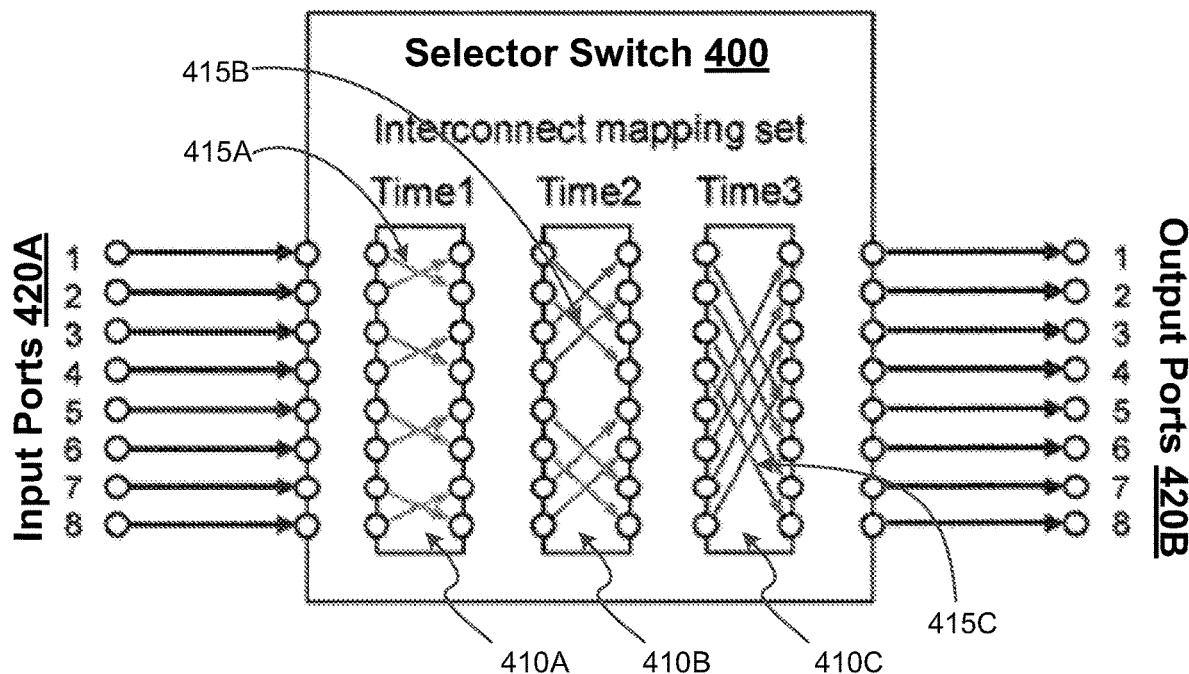
FIG. 4A depicts an example of a selector switch, in accordance with some example embodiments.

To further illustrate, FIG. 4A depicts a selector switch 400, in accordance with some example embodiments. Referring to FIG. 4A, the selector switch 400 may be configured to interconnect a plurality of input ports 420A with a plurality of output ports 420B by at least switching between a plurality of interconnection patterns including, for example, a first interconnection pattern 410A at a first time $\tau_1$, then a second interconnection pattern 410B at a second time $\tau_2$, and then a third interconnection pattern 410C at a third time $\tau_3$.

The first interconnection pattern 410A, the second interconnection pattern 410B, and the third interconnection pattern 410C may form a subset of some but not all of the possible interconnection patterns between the input ports 420A and the output ports 420B. For example, an N! quantity of interconnection patterns may be possible between an N quantity of input ports with an N quantity of output ports. However, the first interconnection pattern 410A, the second interconnection pattern 410B, and the third interconnection pattern 410C may provide three interconnection patterns, which is fewer than the N! quantity of possible interconnection patterns. In some example embodiments, k may be equal to $\log_2 N$. Alternatively and/or additionally, k may be less than or equal to N.

Referring again to FIG. 4A, the selector switch 400 may be configured to switch between the first interconnection pattern 410A, the second interconnection pattern 410B, and the third interconnection pattern 410C. For instance, as shown in FIG. 4A, the selector switch 400 may switch to the first interconnection pattern 410A at a first time $\tau_1$, the second interconnection pattern 410B at a second time $\tau_2$, and the third interconnection pattern 410C at a third time $\tau_3$.

Figure 4B:
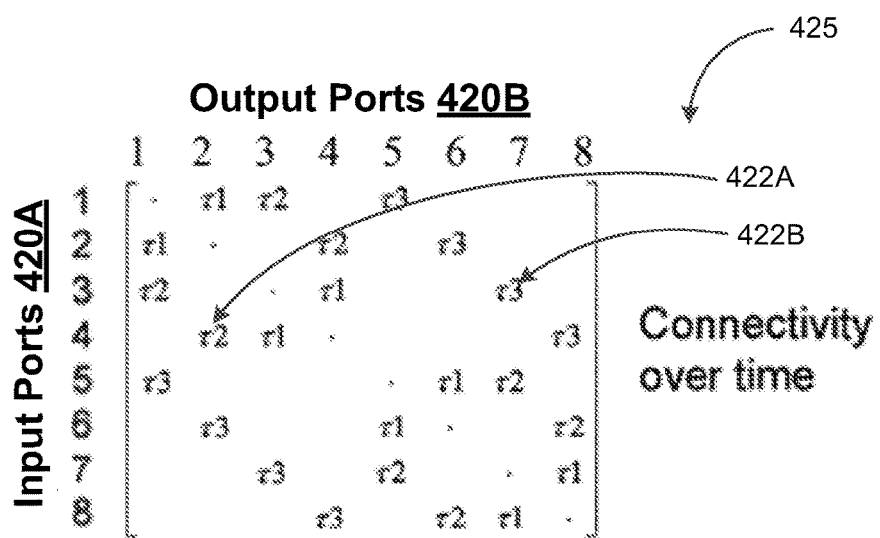
FIG. 4B depicts a matrix illustrating the connectivity of a selector switch over time, in accordance with some example embodiments.

To further illustrate, FIG. 4B depicts a matrix 425 illustrating the connectivity of the selector switch 400 over time, in accordance with some example embodiments. The value for each element in the matrix 425 may indicate the time at which a connection exists between a corresponding pair of input port and output port. For instance, a first element 422A may be associated with the value $\tau_2$ indicating that input port 4 and output port 5 are connected at the second time $\tau_2$. Meanwhile, a second element 422B may be associated with the value $\tau_3$ indicating that input port 3 and output port 7 are connected at the third time $\tau_3$.

As the matrix 425 indicates, at the first time $\tau_1$, the first interconnection pattern 210A may provide direct connections between input port 1 and output port 2, input port 2 and output port 1, input port 3 and output port 4, input port 4 and output port 3, input port 5 and output port 6, input port 6 and output port 5, input port 7 and output port 8, and output port 8 and input port 7. Meanwhile, at the second time $\tau_2$, the second interconnection pattern 410B may provide direction connections between input port 1 and output port 3, input port 2 and output port 4, input port 3 and output port 1, input port 4 and output port 2, input port 5 and output port 7, input port 6 and output port 8, input port 7 and output port 5, and input port 8 and output port 6. Alternatively and/or additionally, at the third time $\tau_3$, the third interconnection pattern 410C may provide direct connections between input port 1 and output port 5, input port 2 and output port 6, input port 3 and output port 7, input port 4 and output port 8, input port 5 and output port 1, input port 6 and output port 2, input port 7 and output port 3, and input port 8 and output port 4.

In some example embodiments, full connectivity between the input ports 420A and the output ports 420B may be realized over time by cycling through the first interconnection pattern 410A, the second interconnection pattern 410B, and/or the third interconnection pattern 410C. The first interconnection pattern 410A, the second interconnection pattern 410B, and/or the third interconnection pattern 410C may provide direct connections between at least some of the input ports 420A and the output ports 420B of the selector switch 400.

Alternatively and/or additionally, the first interconnection pattern 410A, the second interconnection pattern 410B, and/or the third interconnection pattern 410C may also provide indirect connections between the input ports 420A and/or the output ports 420B of the selector switch 400. As used herein, an indirect connection between an input port and an output port may include at least one hop through one or more intermediary input ports and/or output ports. It should be appreciated that an indirect connection between an input port and an output port may include a maximum N quantity of hops. To further illustrate, as shown in FIGS. 4A-B, the first interconnection pattern 410A, the second interconnection pattern 410B, and the third interconnection pattern 410C may each provide an indirect connection between input port 1 to output port 8, which nay include one or more hops through intermediary input ports and/or output ports.

For instance, the indirect connection between input port 1 and output port 8 may include a plurality of intermediary ports including, for example, output port 2 and input port 4. To further illustrate, the first interconnection pattern 410A may include a first direct connection 415A between input port 1 and output port 2. Thus, at the first time $\tau_1$, information may be transferred, via the first direct connection 415A, from input port 1 to output port 2. This information may be stored at output port 2 until the second time $\tau_2$. Meanwhile, the second interconnection pattern 210B may provide a second direct connection 415B between output port 2 and input port 4. At the second time $\tau_2$, the information stored at output port 2 may be transferred, via the second direct connection 415B, from output port 2 to input port 4. The information may again be stored at input port 4 until the third time $\tau_3$. Referring again to FIG. 4A, the third interconnection pattern 410C may provide a third direct connection 415C between input port 4 and output port 8. Accordingly, the third time $\Sigma_3$, the information stored at input port 4 may be transferred, via the third direct connection 415C, from input port 4 to output port 8. It should be appreciated that at least some of the input ports 420A and/or the output ports 420B may include memory for storing information that is being conveyed through an indirect connection between an input port and an output port.

In some example embodiments, the selector switch 400 may be configured to schedule traffic between the input ports 420A and the output ports 420B of the selector switch 400 based on a respective quantity and/or priority of local traffic and non-local traffic traversing the selector switch 400. As used herein, local traffic between a first port and a second port may refer to traffic originating from the first port and destined for the second port. By contrast, non-local traffic between the first port and the second port may refer to traffic that is being routed through the first port in order to reach the second port and/or a third port.

Figure 5:
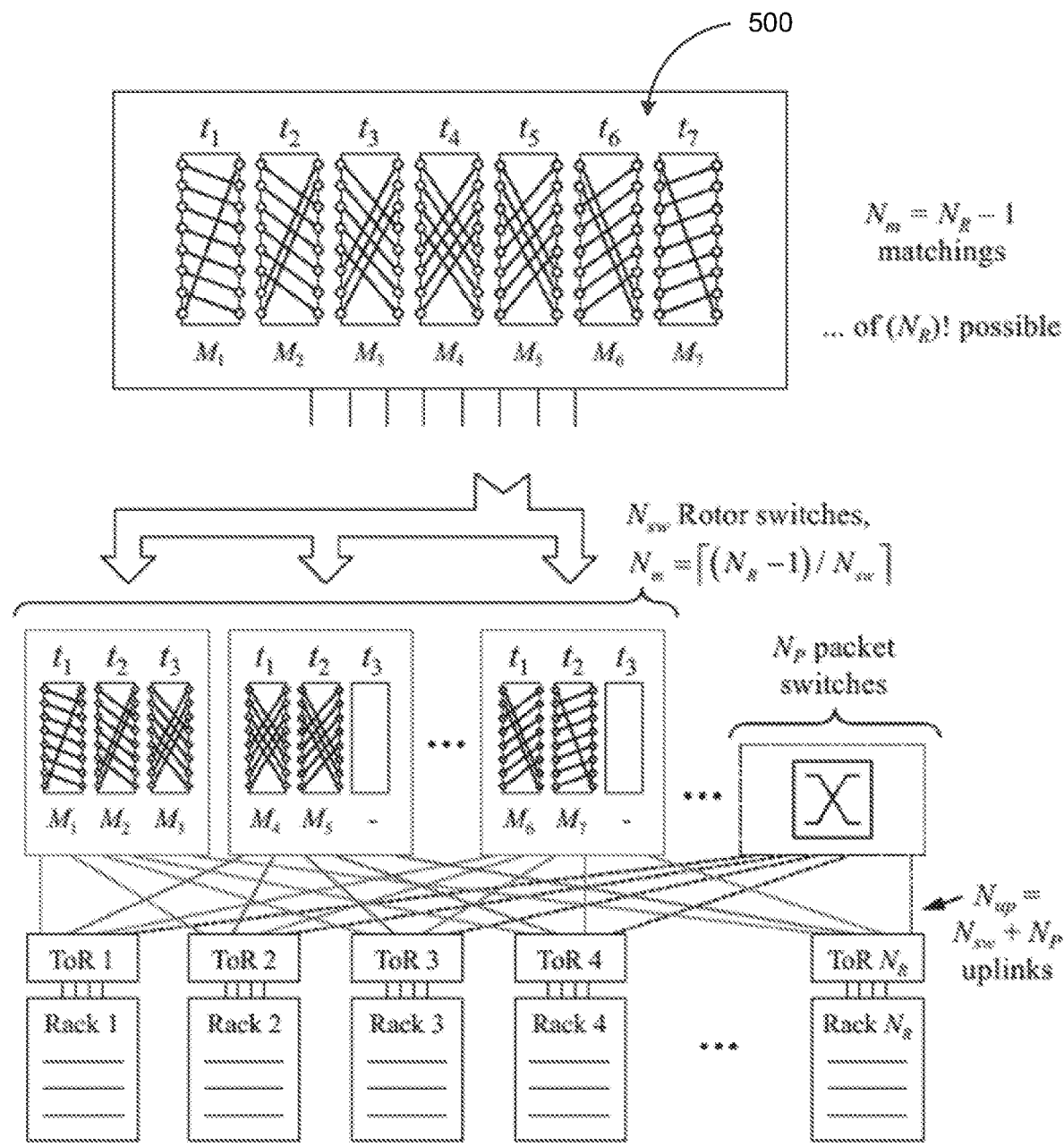
FIG. 5 depicts a selector switch interconnecting a plurality of computing nodes, in accordance with some example embodiments.

In some example embodiments, a selector switch may interconnect a plurality of computing nodes in a circuit switched network. For example, FIG. 5 depicts a selector switch 500 that interconnects an $N_R$ quantity of endpoints populating a circuit switched network by at least interconnecting the corresponding $N_R$ quantity of switches. As used herein, an endpoint may refer to a physical and/or logical grouping of any number of computing nodes. It should be appreciated that an endpoint that includes multiple computing nodes can be referred to as a rack and the switch that is coupled with the rack may be referred to as a top-of-rack switch.

As shown in FIG. 5, the selector switch 500 may switch between an $N_m$ quantity of interconnection patterns or matchings. Each interconnection pattern may provide a direct connection between one or more pairs of switches in the $N_R$ quantity of switches. Switching through the $N_m$ quantity of interconnection patterns may provide full connectivity across every pair of switches in the $N_R$ quantity of switches.

Figure 6:
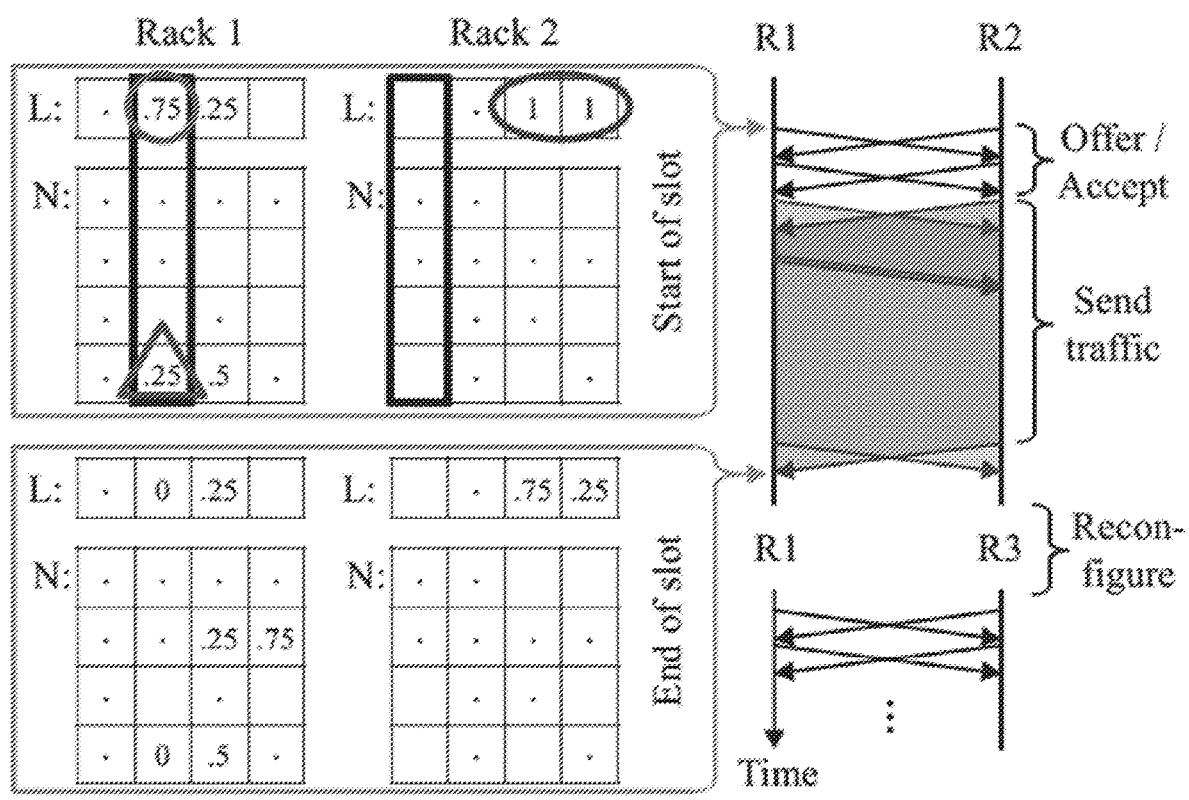
FIG. 6 depicts traffic scheduling using a selector switch, in accordance with some example embodiments.

FIG. 6 depicts traffic scheduling using the selector switch 500, in accordance with some example embodiments. In some example embodiments, each of the $N_R$ quantity of endpoints may hold direct traffic whose destination is another endpoint in the $N_R$ quantity of endpoints that may be directly reachable via one of the $N_m$ quantity of interconnection patterns. Alternatively and/or additionally, each of the $N_R$ quantity of endpoints may also hold indirect traffic whose destination is another endpoint in the $N_R$ quantity of endpoints that may only be reachable by hops through one or more intermediary endpoints. As such, FIG. 6 □hows that each of the $N_R$ quantity of endpoints in the circuit switched network may be associated with a non-local queue (N) for holding indirect traffic and a local queue (L) for holding direct traffic. In the scenario shown in FIG. 6, the quantity of direct traffic and/or indirect traffic may be normalized such that a single unit of traffic may be transferred between two endpoints when the two endpoints are connected by an interconnection pattern. As used herein, a timeslot may correspond to a period of time during which the selector switch 500 is switched to one of the $N_m$ quantity of interconnection patterns. Accordingly, for any one timeslot, a single unit of traffic may be transferred between each pair of the $N_R$ quantity of endpoints that are connected by one of the $N_m$ quantity of interconnection patterns.

In some example embodiments, the selector switch 500 may be configured to switch through the $N_m$ quantity of interconnection patterns in a predictable manner, thereby enabling each of the $N_R$ quantity of switches to determine which pairs of the $N_R$ quantity of endpoints will be directly connected during one or more future timeslots. Thus, for each timeslot, each of the $N_R$ quantity of switches may schedule to deliver non-local traffic and/or local traffic that are queued at each of the corresponding $N_R$ quantity of endpoints. Each of the $N_R$ quantity of switches that are connected during a timeslot may further exchange offer packets and acceptance packets in order to determine the quantity of buffer space to allocate at each of the corresponding $N_R$ quantity of endpoints for queueing additional non-local traffic. Additional non-local traffic may be forwarded to the appropriate endpoints based on the allocation of buffer space.

Referring again to FIG. 6, local traffic and/or non-local traffic queued at a first endpoint $R_1$ and a second endpoint $R_2$ may be scheduled for delivery by the corresponding switches. For instance, the switches may compute, based on a snapshot of non-local traffic queue (N) and the local traffic queue (L) at each of the first endpoint $R_1$ and/or the second endpoint $R_2$, a quantity of traffic that are destined for the endpoints that will be connected to the first endpoint $R_1$ and/or the second endpoint $R_2$ by the next interconnection pattern. According to some example embodiments, the delivery of non-local traffic queued at the first endpoint $R_1$ and/or the second endpoint $R_2$ may be prioritized in order to prevent non-local traffic from being held at an intermediate endpoint for an extended period of time. Alternatively and/or additionally, the delivery of local traffic queued at the first endpoint $R_1$ and/or the second endpoint $R_2$ may be prioritized. For instance, for a timeslot during which the first endpoint $R_1$ may be connected to the second endpoint $R_2$, a first switch $ToR_1$ coupled with the first endpoint $R_1$ may schedule to deliver, to the second endpoint $R_2$, the non-local traffic queued at the first endpoint $R_1$ before the local traffic queued at the first endpoint $R_1$ if the uplink capacity between the first endpoint $R_1$ and the second endpoint $R_2$ cannot accommodate the entirety of the non-local traffic and the local traffic queued at the first endpoint $R_1$.

To further illustrate, FIG. 6 shows that 0.75 units of local traffic originating at the first endpoint $R_1$ and destined for the second endpoint $R_2$ may be queued at the first endpoint $R_1$. Furthermore, 0.25 units of non-local traffic, which is being routed through the first endpoint $R_1$ to reach the second endpoint $R_2$, may also be queued at the first endpoint $R_1$. Accordingly, the first switch $ToR_1$ associated with the first endpoint $R_1$ may schedule the 0.25 units of non-local traffic as well as the 0.75 units of local traffic for delivery during a next timeslot during which the first endpoint $R_1$ and the second endpoint $R_2$ are connected by one of the $N_m$ quantity of interconnection patterns. For instance, the first switch $ToR_2$ may allocate at least some of its uplink capacity during that upcoming timeslot to accommodate the transfer of the 0.25 units of local traffic and the 0.75 units of non-local traffic from the first endpoint $R_1$ to the second endpoint $R_2$. By contrast, a second switch $ToR_2$ associated with the second endpoint $R_2$ may not be required to make any allocations of its uplink capacity because no non-local traffic and/or local traffic are queued at the second endpoint $R_2$.

In some example embodiments, in addition to allocating the uplink capacity for delivering of the non-local traffic and/or the local traffic, each of the $N_R$ quantity of switches may further form an offer packet containing an indication of a quantity of the remaining local traffic and/or a quantity of the remaining uplink capacity at each of the $N_R$ quantity of switches and/or the corresponding endpoints. The smaller of the two quantities may correspond to a quantity of indirect traffic that requires routing through another switch and/or endpoint. At the start of a timeslot, switches that are connected by a corresponding interconnection pattern may exchange offer packets. A switch may determine, based on the offer packets received from one or more other switches, a quantity of non-local traffic that the switch is able to accept from other endpoints. For example, the switch may determine the quantity of local traffic and/or non-local traffic that cannot be delivered during the current timeslot. The quantity of non-local traffic the switch may be able to accept per destination may correspond to a difference between a quantity of traffic that may be sent during a single timeslot and a total quantity of local traffic and/or non-local traffic that are still queued at the corresponding endpoint. Because the acceptable quantity of indirect traffic may be limited to a quantity of traffic that may be delivered during the next timeslot including any local traffic and/or non-local traffic still queued at the endpoint, the maximum time required for delivering traffic between the $N_R$ quantity of endpoints may be bound to $N_m+1$ timeslots.

In some example embodiments, as an optimization, a switch may begin sending the non-local traffic and/or local traffic that are allocated for delivery during a particular timeslot before the completion of the offer and acceptance protocol to determine the quantity of additional non-local traffic that m-y be buffered at a corresponding endpoint.

For instance, referring % gain to FIG. 6, the first switch $ToR_1$ may receive, from the second switch $ToR_2$, an offer packet indicating that the second endpoint $R_2$ has 1 unit of traffic destined for a third endpoint $P_3$ and a fourth endpoint $R_4$, and that the second endpoint $R_2$ has full uplink capacity to forward that traffic. The first switch $ToR_1$ may determine that the first endpoint $R_1$ has already queued 0.25 units of local traffic for the third endpoint $R_3$ as well as 0.5 units of non-local traffic for the third endpoint $R_3$. To utilize the remaining uplink capacity from the second endpoint $R_2$, the first switch $ToR_1$ may determine to accept, from the second endpoint $R_2$, 0.25 units of the non-local traffic destined for the third endpoint $R_3$ and 0.75 units of the non-local traffic destined for the fourth endpoint $R_4$. Accordingly, the first top-of-endpoint-switch $ToR_1$ may form an acceptance packet indicating to the second switch $ToR_2$ that the first endpoint $R_2$ may accept, from the second endpoint $R_2$, 0.25 units of the non-local traffic destined for the third endpoint $R_3$ and 0.75 units of the non-local traffic destined for the fourth endpoint $R_4$.

In some example embodiments, the switch for a first endpoint may receive, from a second endpoint and/or a switch associated with the second endpoint, an acceptance packet indicating a quantity of indirect traffic the second endpoint may accept from the first endpoint. For example, the acceptance packet from the second endpoint may indicate a quantity of buffer space allocated at the second endpoint for non-local traffic from the first endpoint. Upon sending the local traffic and/or the non-local traffic queued at the first endpoint, the switch associated with the first endpoint may send, to the second endpoint, non-local traffic. The switch at the first endpoint may determine, based on the acceptance a package, a quantity of non-local traffic to send to the second endpoint. As such, the quantity of non-local sent to the second endpoint may correspond to the quantity of buffer space allocated at the second endpoint.

For instance, as shown in FIG. 6, the second switch $ToR_1$ at the second endpoint $R_2$ may receive, from the first switch $ToR_1$ at the first endpoint $R_1$, the acceptance packet indicating that the first endpoint $R_1$ may be able to accept, from the second endpoint $R_2$, 0.25 units of the non-local traffic destined for the third endpoint $R_3$ and 0.75 units of the non-local traffic destined for the fourth endpoint $R_4$. In response to receiving the acceptance packet from the first switch $ToR_1$, the second switch $ToR_2$ may forward, to the first endpoint $R_1$, a corresponding quantity of non-local traffic. For instance, the second switch $ToR_2$ may send, to the first endpoint $R_1$, the 0.25 units of the non-local traffic destined for the third endpoint $R_3$ and the 0.75 units of the non-local traffic destined for the fourth endpoint $R_4$. The first endpoint $R_1$ may store, as non-local traffic in the non-local traffic queue (N) at the first endpoint $R_1$, the 0.25 units of the non-local traffic destined for the third endpoint $R_3$ and the 0.75 units of the non-local traffic destined for the fourth endpoint $R_4$.

In some example embodiments, the scheduling of traffic between the $N_R$ quantity of endpoints may be performed for each timeslot by a different set of endpoints that are interconnected by a corresponding interconnection pattern at the selector switch 500. For example, a first interconnection pattern from the $N_m$ quantity of interconnection patterns may, during a first timeslot, interconnect a first set of endpoints from the $N_R$ quantity of endpoints while a second interconnection pattern may, during a second timeslot, interconnect a second set of endpoints from the $N_R$ quantity of endpoints. Accordingly, the switches coupled with the first set of endpoints may, during the first timeslot, schedule the flow of traffic between the first set of endpoints including, by sending local traffic and/or non-local traffic already queued at each corresponding endpoint at the start of the first timeslot and engaging in the offer-acceptance protocol to transfer additional non-local traffic. Likewise, the switches coupled with the second set of endpoints may, during the second timeslot, schedule the flow of traffic between the second set of endpoints. As noted, the traffic scheduling may include sending local traffic and/or non-local traffic already queued at each corresponding endpoint at the start of the second timeslot and engaging in the offer-acceptance protocol to transfer additional non-local traffic.

Table 1 below depicts pseudo programming code implementing the scheduling of traffic between a plurality of computing nodes (e.g., the $N_R$ quantity of endpoints) interconnected by a selector switch.

TABLE 1

| Algorithm 1 RotorLB Algorithm |
| --- |
| function PHASE 1(Enqueued data, slot length) |
|    alloc ← maximum possible direct data |
|    capacity ← slot length minus alloc |
|    offer ← remaining local data |
|    send offer, capacity to connected modes       > offer |
|    send allocated direct data |
|    remain ← size of unallocated direct data |
|    return remain |
| function PHASE 2(remain, LB length) |
|    recv offer and capacity from connected nodes |
|    indir ← no allocated data |
|    avail ← LB length minus remain |
|    $offer_i$ ← $offer_i$ if $avail_i \neq 0$ |
|    offerscl ← fairshare of capacity over offer |
|    while offerscl has nonzero columns do |
|       for all nonzero columns i in offerscl do |
|          tmpfs ← fairshare of $avail_i$ over $offerscl_i$ |
|          $avail_i$ ← $avail_i$ - sum(tmpfs) |
|          indir ← tmpfs |
|    offerset ← offer - indir |
|    tmplc ← capacity - sum(indir) |
|    offerscl ← fairshare of tmplc over offerscl |
|    send indir to connected nodes       > accept |
| function PHASE 3(Enqueued local data) |
|    recv indir from connected nodes |
|    $local_i$ ← enqueued local data for host i |
|    $indir_i$ ← $min(indir_i, local_i)$ |
|    send $indir_i$ indirect local data for host i |

Figure 7:
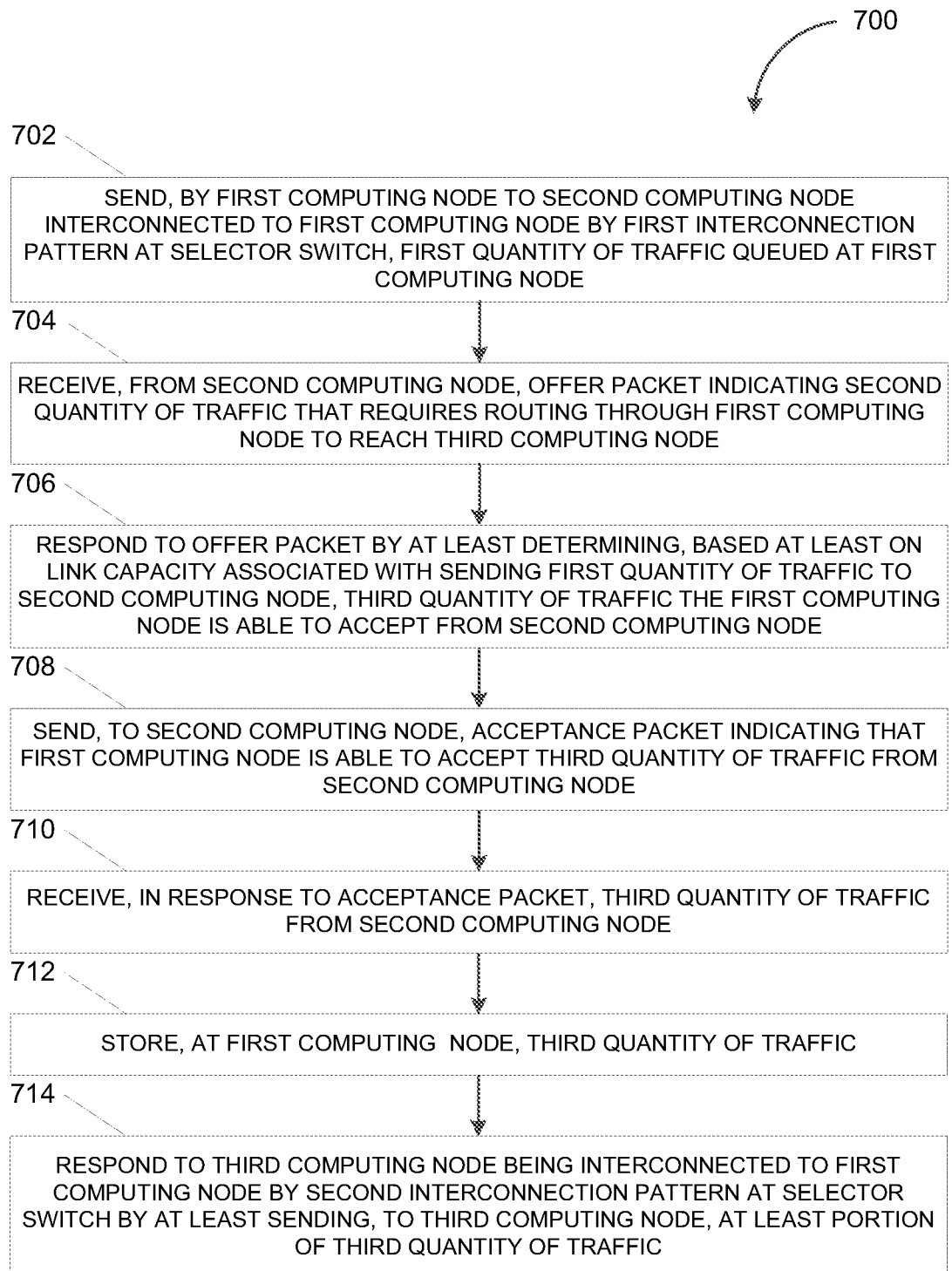
FIG. 7 depicts a flowchart illustrating a process for traffic routing, in accordance with some example embodiments.

FIG. 7 depicts a flowchart illustrating a process 700 for traffic routing, in accordance with some example embodiments. Referring to FIGS. 5-7, the process 700 may be performed by a computing node that is interconnected to one or more other computing nodes by a selector switch such as, for example, the selector switch 400, the selector switch 500, and/or the like. In some example embodiments, the process

800 may be performed at each of a plurality of computing nodes interconnected by a selector switch in order to route traffic directly and/or indirectly between the computing nodes.

At 702, a first computing node may send, to a second computing node interconnected to the first computing node by a first interconnection pattern at a selector switch, a first quantity of traffic queued at the first computing node. For example, as shown in FIG. 6, 0.25 units of local traffic destined for the second endpoint $R_2$ as well as 0.75 units of non-local traffic that requires routing through the second endpoint $R_2$ to reach its destination may be queued at the first endpoint $R_1$. Accordingly, the first switch $ToR_1$ associated with the first endpoint $R_1$ may schedule the 0.25 units of non-local traffic as well as the 0.75 units of local traffic for delivery during a next timeslot during which the first endpoint $R_1$ and the second endpoint $R_2$ are connected by one of the $N_m$ quantity of interconnection patterns. In some example embodiments, in order to prevent non-local traffic from being queued at an intermediate endpoint for an extended period of time, the first switch $ToR_1$ may prioritize the delivery of non-local traffic queued at the first endpoint $R_1$ over the delivery of local traffic queued at the first endpoint $R_1$ when the available uplink capacity is unable to accommodate the entirety of the non-local traffic and local traffic. In the example shown in FIG. 6, the first switch $ToR_1$ may be able to allocate sufficient uplink capacity between the first endpoint $R_1$ and the second endpoint $R_2$ to send, to the second endpoint $R_2$, the 0.25 units of non-local traffic as well as the 0.75 units of local traffic.

At 704, the first computing node may receive, from the second computing node, an offer packet indicating a second quantity of traffic that requires routing through the first computing node to reach a third computing node. For example, the first switch $ToR_1$ may receive, from the second switch $ToR_2$, an offer packet indicating that the second endpoint $R_2$ has 1 unit of traffic destined for a third endpoint $R_3$ and a fourth endpoint $R_4$, and that the second endpoint $R_2$ has full uplink capacity to forward that traffic.

At 706, the first computing node may respond to the offer packet by at least determining, based at least on a link capacity associated with sending the first quantity of traffic to the second computing node, a third quantity of traffic the first computing node is able to accept from the second computing node. For instance, in some example embodiments, the first switch $ToR_1$ may determine that the first endpoint $R_1$ has already queued 0.25 units of local traffic for the third endpoint $R_3$ as well as 0.5 units of non-local traffic for the third endpoint $R_3$. In order to utilize the remaining uplink capacity between the first endpoint $R_1$ and the second endpoint $R_2$, the first switch $ToR_1$ may determine to accept, from the second endpoint $R_2$, 0.25 units of the non-local traffic destined for the third endpoint $R_3$ and 0.75 units of the non-local traffic destined for the fourth endpoint $R_4$.

At 708, the first computing node may send, to the second computing node, an acceptance packet indicating that the first computing node is able to accept the third quantity of traffic from the second computing node. For example, the first top-of-endpoint-switch $ToR_1$ may send, to the second switch $ToR_2$, an acceptance packet indicating to the second switch $ToR_2$ that the first endpoint $R_1$ may accept, from the second endpoint $R_2$, 0.25 units of the non-local traffic destined for the third endpoint $R_3$ and 0.75 units of the non-local traffic destined for the fourth endpoint $R_4$.

At 710, the first computing node may receive, in response to the acceptance packet, the third quantity of traffic from the second computing node. For example, the second switch $ToR_1$ respond to the acceptance packet from the first switch $ToR_1$ by at least forwarding, to the first endpoint $R_1$, the 0.25 units of the non-local traffic destined for the third endpoint $R_3$ and the 0.75 units of the non-local traffic destined for the fourth endpoint $R_4$.

At 712, the first computing node may store, at the first computing node, the third quantity traffic. For instance, the first endpoint $R_1$ may store, as non-local traffic in the non-local traffic queue (N) at the first endpoint $R_1$, the 0.25 units of the non-local traffic destined for the third endpoint $R_3$ and the 0.75 units of the non-local traffic destined for the fourth endpoint $R_4$.

At 714, the first computing node may respond to the third computing node being interconnected to the first computing node by a second interconnection pattern at the selector switch by at least sending, to the third computing node, at least a portion of the third quantity of traffic. In some example embodiments, the first endpoint $R_1$ may be interconnected with the third endpoint $R_3$ and/or the fourth endpoint $R_4$ when the selector switch 500 switches to a next interconnection pattern in the $N_m$ quantity of interconnection patterns. Accordingly, when the first endpoint $R_1$ is interconnected with the third endpoint $R_3$ and/or the fourth endpoint $R_4$, the first switch $ToR_1$ may schedule to send, to the third endpoint $R_3$ and/or the fourth endpoint $R_4$, the non-local traffic queued at the first endpoint $R_1$ including the 0.25 units of the non-local traffic destined for the third endpoint $R_3$ and the 0.75 units of the non-local traffic destined for the fourth endpoint $R_4$.

Figure 8:
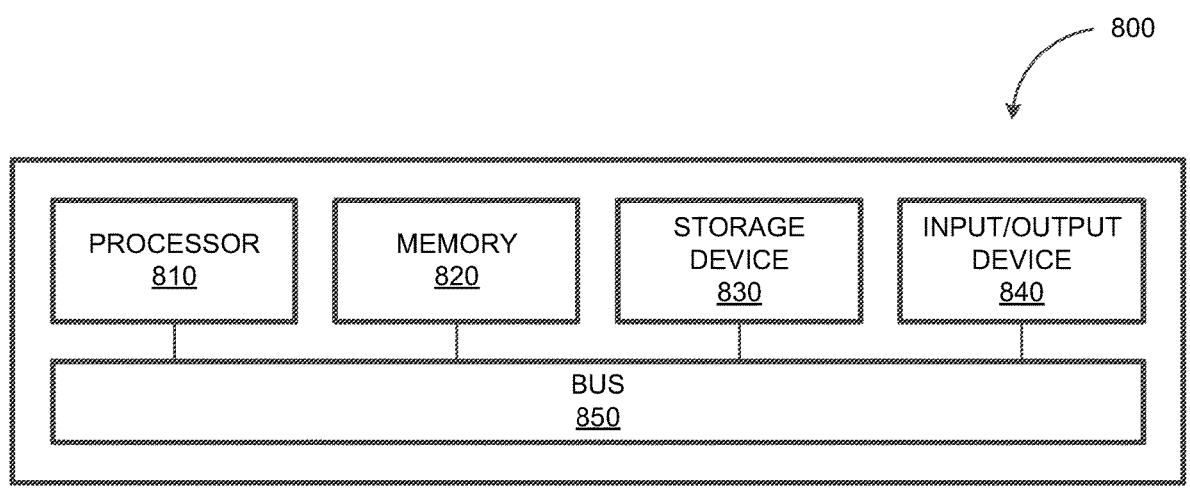
FIG. 8 depicts a block diagram illustrating a computing system, in accordance with some example embodiments.

FIG. 8 depicts a block diagram illustrating a computing system 800 consistent with implementations of the current subject matter. Referring to FIGS. 1A-B and 2A-C, the computing system 800 may be configured to implement a network interface device (e.g., the network interface device 100, the first network interface device 210A, the second network interface device 210B, and/or the like) and/or any components therein. Alternatively and/or additionally, referring to FIGS. 4A-B, and 5-6, the computing system 800 may also be configured to implement a selector switch (e.g., the selector switch 400, the selector switch 500, and/or the like) and/or any components therein. The computing system 800 may also be configured to implement any element within a network including, for example, a switch and/or the like.

As shown in FIG. 8, the computing system 800 may include a processor 810, a memory 820, a storage device 830, and input/output device 840. The processor 810, the memory 820, the storage device 83C, and the input/output device 840 can be interconnected via a system bus 850. The processor 810 is capable of processing instructions for execution within the computing system 800. Such executed instructions can implement one or more components of, for example, the computing system 800. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects e features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one r more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   at least one data processor; and
   at least one memory storing instructions, which when executed by the at least one data processor, cause the apparatus to at least:
   detect that a data carrier signal from a circuit switched network is offline, the data carrier signal from the circuit switched network being offline while the circuit switched network is undergoing reconfiguration, and the data carrier signal from the circuit switched network being restored once the circuit switched network completes reconfiguration; and
   in response to detecting that the data carrier signal from the circuit switched network is offline,
   send, to a network element coupled with the circuit switched network via the apparatus, one or more control packets indicating that the data carrier signal from the circuit switched network is offline, and maintain, between the apparatus and the network element, an active data carrier signal by at least sending, to the network element, one or more protocol idle frames.

2. The apparatus of claim 1, wherein the apparatus is further caused to at least:
buffer, at the apparatus, a first packet sent from the network element to the circuit switched network.

3. The apparatus of claim 2, wherein the apparatus is further caused to at least:
detect that the data carrier signal from the circuit switched network is online; and
in response to detecting that the data carrier signal from the circuit switched network is online,
send, to the network element, one or more control packets indicating that the data carrier signal from the circuit switched network is online,
send, to the circuit switched network, the first packet buffered at the apparatus while the data carrier signal from the circuit switched network is offline, and
forward, to the circuit switched network, a second packet sent from the network element to the circuit switched network.

4. The apparatus of claim 2, wherein the apparatus is further caused to at least:
receive, from the network element, the first packet; and
classify, based at least on a header of the first packet, the first packet as a data packet, the first packet being buffered at the apparatus based at least on the first packet being classified as the data packet.

5. The apparatus of claim 2, wherein the apparatus is further caused to at least:
receive, from the circuit switched network, a second data packet;
classify, based at least on a header of the second data packet, the second data packet as a control packet; and
determine, based at least on the second data packet, that the data carrier signal from the circuit switched network is offline.

6. The apparatus of claim 1, wherein the apparatus further comprises one or more physical link layer (PHY) chips for coupling the apparatus with the circuit switched network and/or the network element.

7. The apparatus of claim 1, wherein the apparatus is integrated into the network element.

8. The apparatus of claim 1, wherein the apparatus is configured to serve as an interface between the circuit switched network and a packet switched network containing the network element.

9. The apparatus of claim 1, wherein the one or more control packets are sent to the network element to at least prevent the network element from responding to the data carrier signal being offline as a failure of a data link between the network element and the circuit switched network.

10. The apparatus of claim 1, wherein the data carrier signal from the circuit switched network is offline while the circuit switched network is undergoing reconfiguration, and wherein the data carrier signal from the circuit switched network is restored once the circuit switched network completes reconfiguration.

11. A computer-implemented method, comprising:
detecting, at a network interface device, that a data carrier signal from a circuit switched network is offline, the data carrier signal from the circuit switched network being offline while the circuit switched network is undergoing reconfiguration, and the data carrier signal from the circuit switched network being restored once the circuit switched network completes reconfiguration; and
in response to detecting that the data carrier signal from the circuit switched network is offline,
sending, to a network element coupled with the circuit switched network via the network interface device, one or more control packets indicating that the data carrier signal from the circuit switched network is offline, and
maintaining, between the network interface device and the network element, an active data carrier signal by at least sending, to the network element, one or more protocol idle frames.

12. The method of claim 11, further comprising:
buffering, at the network interface device, a first packet sent from the network element to the circuit switched network.

13. The method of claim 12, further comprising:
detecting that the data carrier signal from the circuit switched network is online; and
in response to detecting that the data carrier signal from the circuit switched network is online,
sending, to the network element, one or more control packets indicating that the data carrier signal from the circuit switched network is online,
sending, to the circuit switched network, the first packet buffered at the network interface device while the data carrier signal from the circuit switched network is offline, and
forwarding, to the circuit switched network, a second packet sent from the network element to the circuit switched network.

14. The method of claim 12, further comprising:
receiving, from the network element, the first packet; and
classifying, based at least on a header of the first packet, the first packet as a data packet, the first packet being buffered at the network interface device based at least on the first packet being classified as the data packet.

15. The method of claim 12, further comprising:
receiving, from the circuit switched network, a second data packet;
classifying, based at least on a header of the second data packet, the second data packet as a control packet; and
determining, based at least on the second data packet, that the data carrier signal from the circuit switched network is offline.

16. The method of claim 11, wherein the network interface device is configured to serve as an interface between the circuit switched network and a packet switched network containing the network element.

17. The method of claim 11, wherein the one or more control packets are sent to the network element to at least prevent the network element from responding to the data carrier signal being offline as a failure of a data link between the network element and the circuit switched network.

18. A non-transitory computer readable medium storing instructions, which when executed by at least one data processor, result in operations comprising:
detecting, at a network interface device, that a data carrier signal from a circuit switched network is offline, the data carrier signal from the circuit switched network being offline while the circuit switched network is undergoing reconfiguration, and the data carrier signal from the circuit switched network being restored once the circuit switched network completes reconfiguration; and in response to detecting that the data carrier signal from the circuit switched network is offline, sending, to a network element coupled with the circuit switched network via the network interface device, one or more control packets indicating that the data carrier signal from the circuit switched network is offline, and maintaining, between the network interface device and the network element, an active data carrier signal by at least sending, to the network element, one or more protocol idle frames.

\* \* \* \* \*